(12) United States Patent
Mezouari et al.

(10) Patent No.: US 7,744,230 B2
(45) Date of Patent: Jun. 29, 2010

(54) BACKLIGHTING DEVICE

(75) Inventors: Samir Mezouari, Basildon (GB); Benoit Roux, Idron (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 68 days.

(21) Appl. No.: 12/106,663

(22) Filed: Apr. 21, 2008

(65) Prior Publication Data

US 2008/0285256 A1 Nov. 20, 2008

(30) Foreign Application Priority Data

May 14, 2007 (GB) ................... 0709309.9

(51) Int. Cl.
*G01D 11/28* (2006.01)
(52) U.S. Cl. .................... 362/26; 362/23; 362/489; 362/511; 362/551; 362/555
(58) Field of Classification Search ............ 362/23, 362/26, 489, 511, 551, 555, 559
See application file for complete search history.

(56) References Cited

U.S. PATENT DOCUMENTS

| 6,979,094 | B1 * | 12/2005 | Venkatram | 362/23 |
| 7,025,482 | B2 * | 4/2006 | Yamashita et al. | 362/511 |
| 2006/0066250 | A1 | 3/2006 | Wang | |
| 2006/0119751 | A1 * | 6/2006 | Suehiro et al. | 349/5 |

FOREIGN PATENT DOCUMENTS

| DE | 19940849 A1 | 3/2001 |
| EP | 0 498 451 A1 | 8/1992 |
| EP | 0 879 991 A2 | 11/1998 |
| GB | 482595 | 3/1938 |
| JP | 57063469 A2 | 4/1982 |
| JP | 2001281008 A2 | 10/2001 |
| JP | 2006194613 A2 | 7/2006 |
| WO | WO 84/00800 A1 | 3/1984 |
| WO | WO 99/26809 A1 | 6/1999 |

* cited by examiner

*Primary Examiner*—Sandra L O'Shea
*Assistant Examiner*—Meghan K Dunwiddie
(74) *Attorney, Agent, or Firm*—Fraser Clemens Martin & Miller LLC; J. Douglas Miller

(57) ABSTRACT

The present invention relates to illumination of an instrument for displaying information suitable for use in a vehicle. The invention provides an illumination device for an instrument of a vehicle comprising: a substantially Y shaped light guide having a first leg portion a second leg portion and a third leg portion coupled at a junction; an LED coupled to one end of the first portion of the light guide; and in which the second portion and the third portion have an internal peripheral portion and an external peripheral portion, and the second leg portion and the third leg portion are arranged in operation to illuminate a segment of an instrument and each of the second leg portion and third leg portion have first grooves formed along the internal peripheral portion, and second grooves formed along the second peripheral portion. An instrument comprising such an illumination device is also provided.

20 Claims, 8 Drawing Sheets

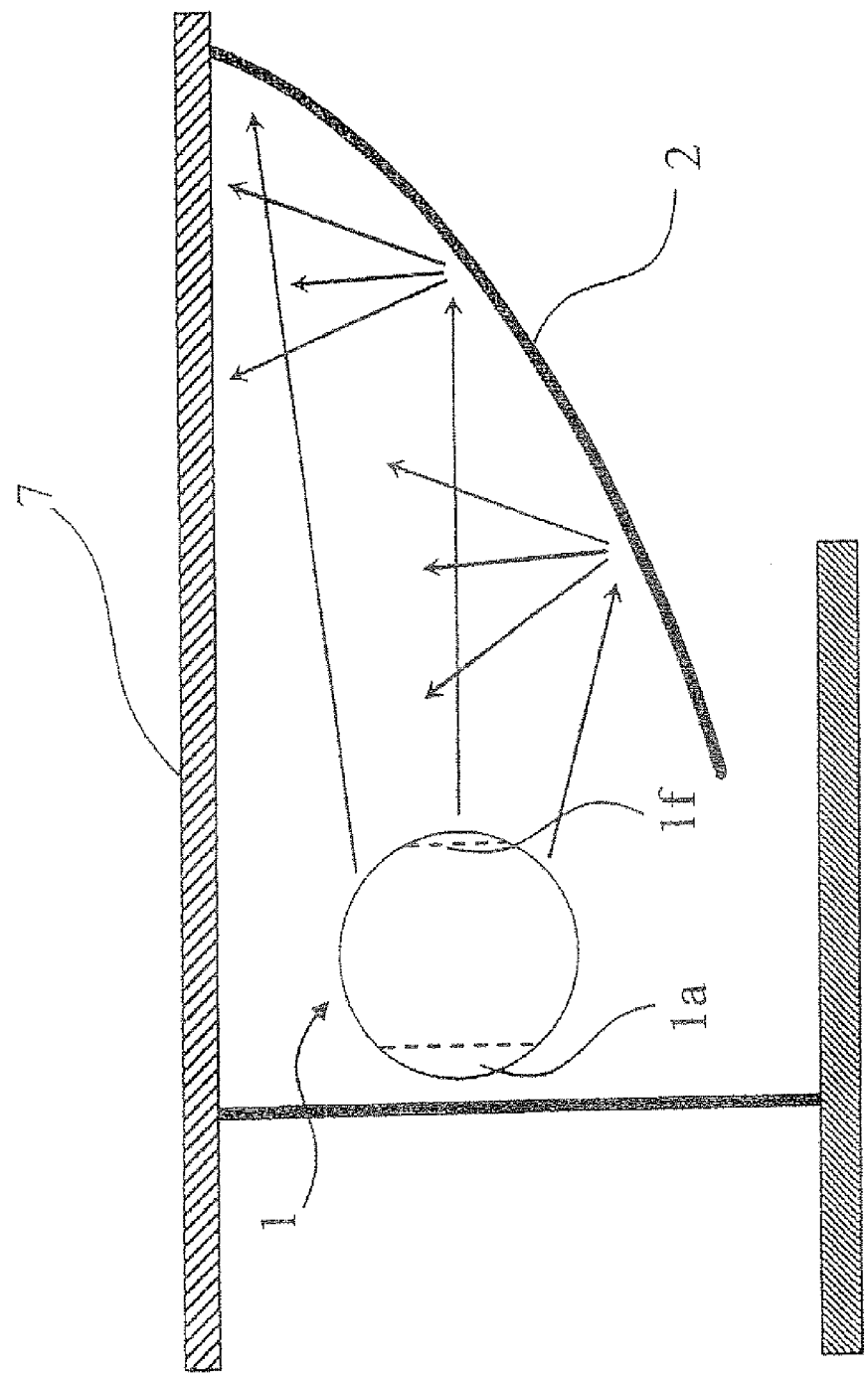

BACKLIGHTING DEVICE

CROSS-REFERENCE TO RELATED APPLICATION

This application claims priority to United Kingdom Patent Application No. 0709309.9, filed May 14, 2007, the entire disclosure of which is hereby incorporated herein by reference.

FIELD OF THE INVENTION

The present invention relates to illumination of an instrument for displaying information. Particularly, the invention relates to illumination for an instrument suitable for use in a vehicle.

BACKGROUND OF THE INVENTION

Instruments in which an illuminated display is useful in include clocks, hand held computer games, mobile phones, and any other instrument which is capable of displaying information electronically. Instruments for displaying information on a vehicle display are usually located on the dashboard of an automotive vehicle, and require some form of illumination to allow the driver to read the information when it is dark. An instrument usually comprises an information bearing surface in a housing having a transparent cover for protection of the instrument. The information bearing surface usually has symbols indicating a scale such as graphics, numbers, or a dial, and a pointer for indicating a point within the scale, or may comprise a liquid crystal display suitable for displaying numeric information. The information bearing surface may also include features such as rings, which define the perimeter of a particular instrument or gauge. The instrument is generally mounted on a printed circuit board (PCB) which is connected to sensors (directly of indirectly via a network) which monitor certain engine conditions such as speed, temperature and fuel level, for example. Conventionally instruments are mounted together to form an instrument cluster. As customer requirements become more sophisticated, it becomes important to provide lighting for vehicle instruments which is both distinctive and cost effective to produce.

Generally, one of two types of illumination is used, either front lighting or back lighting. Front lighting refers to illumination from the viewing side of the information bearing surface which reflects off the information bearing surface. The light need not be perpendicular to the information bearing surface, hence this term includes side lighting, where the light is reflected from the information bearing surface. The information is printed so that the light reflecting from the symbols is in contrast to the light reflecting from a background, for example the symbols may be black and the background may be white or the symbols may be white and the background may be black. When the symbols are lighter than the background the illumination is known as negative mode, and when the symbols are darker than the background the instrument is described as positive mode.

Back lighting refers to illumination of the information bearing surface from the side opposite to the viewing side of the instrument. In this case the information surface contains opaque or semi opaque portions so that the light passing through the information bearing surface renders the symbols visible. Backlighting of vehicle instrument panels has become more common as it is currently considered to provide a better overall appearance for the vehicle instrument panel because it is not required to mount lighting components in front of the instrument.

Front or back lighting may be achieved either by providing illumination directly from a light source (which may include the use of reflective surfaces), or indirectly from a light source which is coupled to a light guide which directs the light from the light source to the required illumination point.

A problem with known instruments which have an associated light source is that, while front lighting allows a simpler design for the information bearing surface and any associated pointers, any cost savings resulting from these simplified designs are negated by the extra costs required for flexible connectors from the PCB to the light source or complex light guides, and for more complex assembly. Front lighting from a point source also often produces shadows. Back lighting on the other hand usually involves the use of a plurality of light sources, and a more complex arrangement is required to illuminate the pointer. Furthermore, applying symbols to the information bearing surface is more complex in the back lighting case because poor distribution of the illumination can cause portions of the instrument to have better illumination than others. This is compensated for by providing different thickness of opaque or semi opaque portions in some areas than in others. However an undesirable effect commonly referred to as "color shift" occurs when using a compensation method and that is particularly noticeable with white color illumination. The color shift is caused by the difference in the coefficient of transmission of light in distinct areas of the information bearing surface.

A further problem with backlighting is that as light sources develop and more light emission becomes possible, particularly with light emitting diodes (LEDs), distribution of that light in an effective manner becomes more difficult.

It is known to use an optical fiber for illumination of instrument panels, for example DE19940849 discloses an optical fiber for illuminating an instrument panel which has a section for radial emission of light.

It is known to use a light conducting member around the edge of a dial for the purpose of illuminating an instrument. For example JP2006194613 discloses arc shaped light guide plates; US2006066250 discloses a glass panel and curved tube light guide made of lighting sensitive material. GB482595 discloses a solid rod-like light conducting member around the edge of a dial. The member may be covered by opaque material except for two slits on the side facing the dial and may be placed behind the cover.

It is known to provide cuts or discontinuities to allow light to escape from an optical fiber. For example, WO8400800 discloses a flexible transmitting guide which may have cuts at intervals along its surface; JP57063469 describes a device for illuminating a watch which has optical fiber with plurality of cuts for emitting light; EP0879991 discloses an illuminating system having a light guide member with slits.

Most conventional instrument clusters are illuminated using several light sources arranged into a circular array of LEDs beneath the graphical information area. A small reduction in the number of LEDs used can be achieved in combination with a balancing technique. Such balancing consists of darkening any bright spots to the level of the lowest brightness spots. However, as mentioned previously, this method induces an undesirable color shift that occurs when a polychromatic source is employed such as white light due to the difference in the spectrum of absorption of light induced by the additional painting or darkening layers.

Another method is to use indirect illumination as disclosed in WO9926809. Such indirect illumination employs few LEDs that are located near the center of the gauge and the emitted light is reflected and diffused in the outward direction by a diffusing deflector. The drawback of this method is that no space is available near the central area of the gauge where it is commonly desirable to have warning lights around the pointer.

To reduce the number of LEDs used and the cost, light guides have increasingly been used. A light guide solution, as disclosed in JP2001281008 uses a small number of LEDs in comparison with direct or indirect illumination, but the LEDs required occupy most of the space on the PCB around a mount for a pointer where warning lights are commonly desired.

European Patent EP0498451 discloses a light guide device for evenly backlighting vehicle instruments where a circular light transmitting rod having a reflection portion formed on a boundary surface is disposed behind a graphical display. The reflection boundary surface is made by applying a diffusing painting layer or by introducing scattering particles, incurring additional tooling costs. Furthermore, the light source is placed at one or both ends of the circular light guide where it is highly desirable to have warning lights or other display features.

There is a need to develop efficient illumination devices that uses a minimum number of LEDs as well as providing uniform illumination and package compactness for use in vehicle instrument clusters.

SUMMARY OF THE INVENTION

Presently provided by the invention is an illumination device for an instrument of a vehicle comprising: a substantially Y shaped light guide having a first leg portion a second leg portion and a third leg portion coupled at a junction; an LED coupled to one end of the first portion of the light guide; and in which the second portion and the third portion have an internal peripheral portion and an external peripheral portion, and the second leg portion and the third leg portion are arranged in operation to illuminate a segment of an instrument and each of the second leg portion and third leg portion have first grooves formed along the internal peripheral portion, and second grooves formed along the second peripheral portion.

In order to achieve uniform illumination, it is preferable if the depth of a first groove is dependent upon the distance of the first groove from the junction such that the depth of the first groove is greater when the distance is greater. For the same reason it is also preferable if the depth of a second groove is dependent upon the distance of the second groove from the junction such that the depth of the second groove is greater when the distance is greater.

In an embodiment the junction is symmetrical such that light from the LED travels through the first leg portion and is equally distributed between the second leg portion and the third leg portion.

According to another aspect of the invention, there is also provided an instrument for a vehicle comprising an information bearing portion; a reflective portion; and an illumination device disposed between the information bearing portion and the reflective portion, such that light escaping from the illumination device is reflected by the reflective portion toward the information bearing portion.

The second leg portion and the third leg portion are typically arranged to illuminate a substantially circular information bearing portion, each of the leg portions illuminating a segment of the information bearing portion.

The leg portions may substantially enclose a central portion of the information bearing portion, and warning lights are disposed therein.

BRIEF DESCRIPTION OF THE DRAWINGS

The above, as well as other advantages of the present invention, will become readily apparent to those skilled in the art from the following detailed description of embodiments of the invention when considered in the light of the accompanying drawings in which:

FIG. 7 is a schematic side cross sectional view of light escaping from the light guide and reflecting toward a display face.

DETAILED DESCRIPTION OF EXEMPLARY EMBODIMENTS OF THE INVENTION

Figure 1:
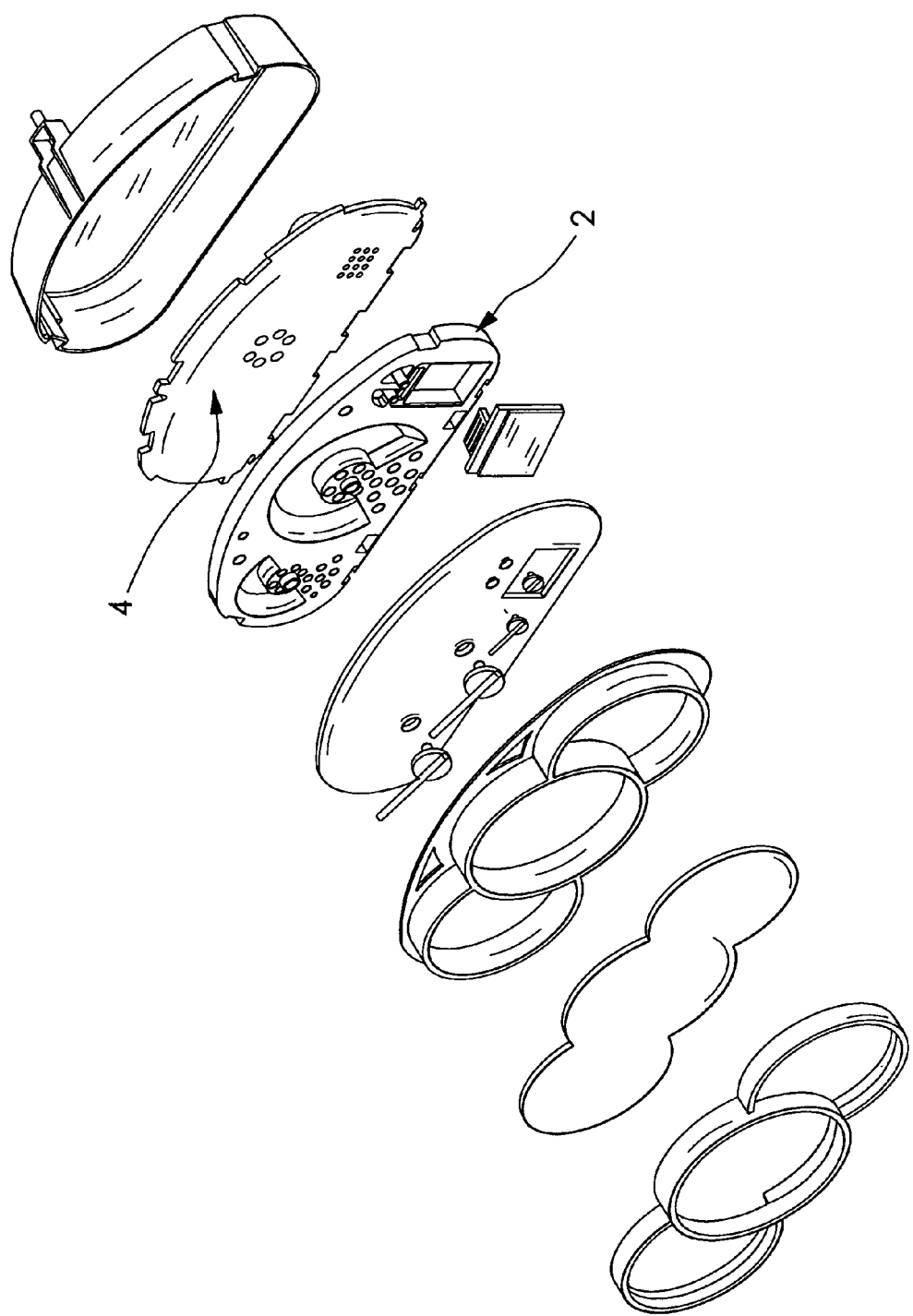
FIG. 1 is an exploded perspective view of a conventional instrument cluster using an array of light sources to backlight a graphical information area in a gauge.
Figure 2:
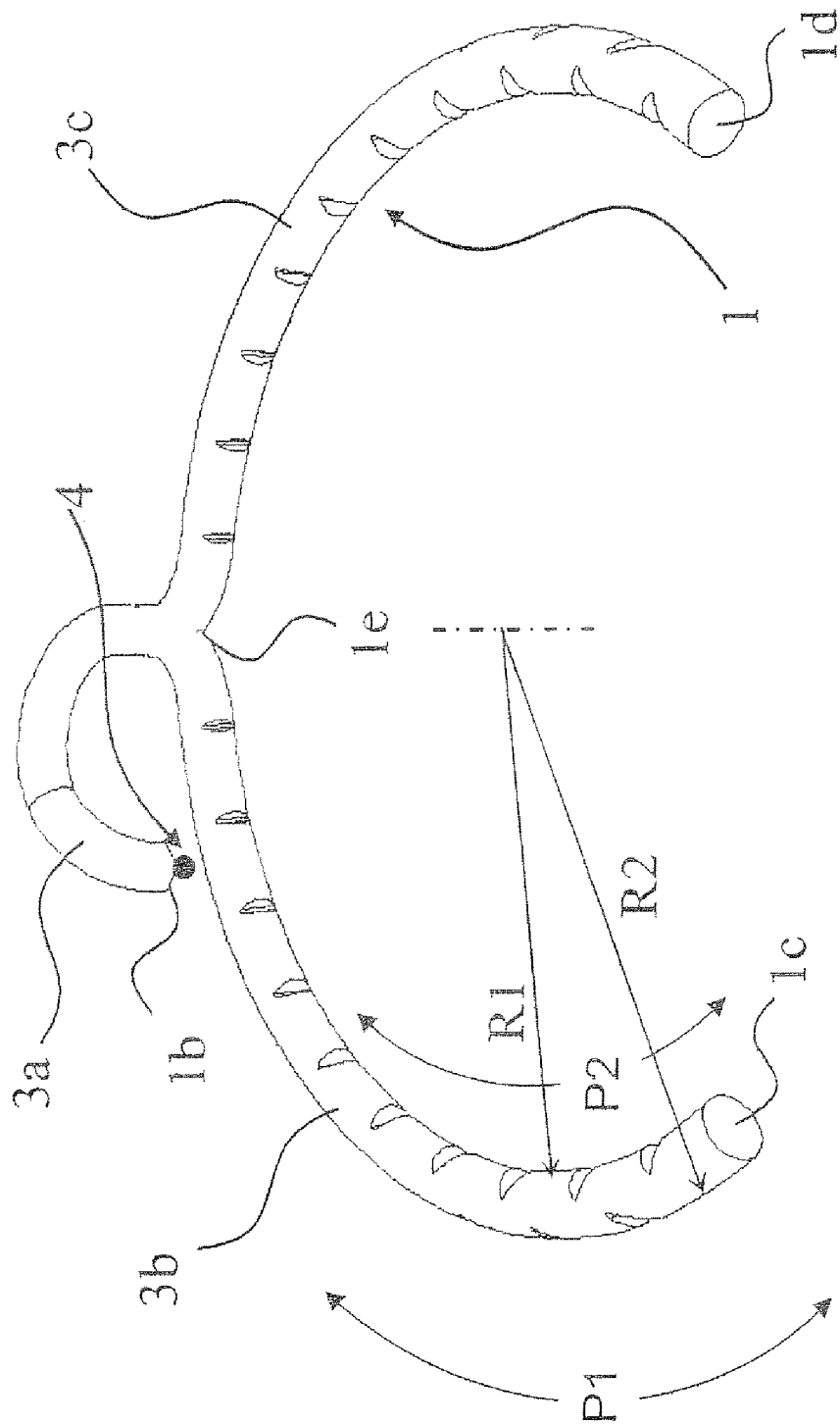
FIG. 2 is a perspective view of a light guide device according to the present invention.
Figure 3:
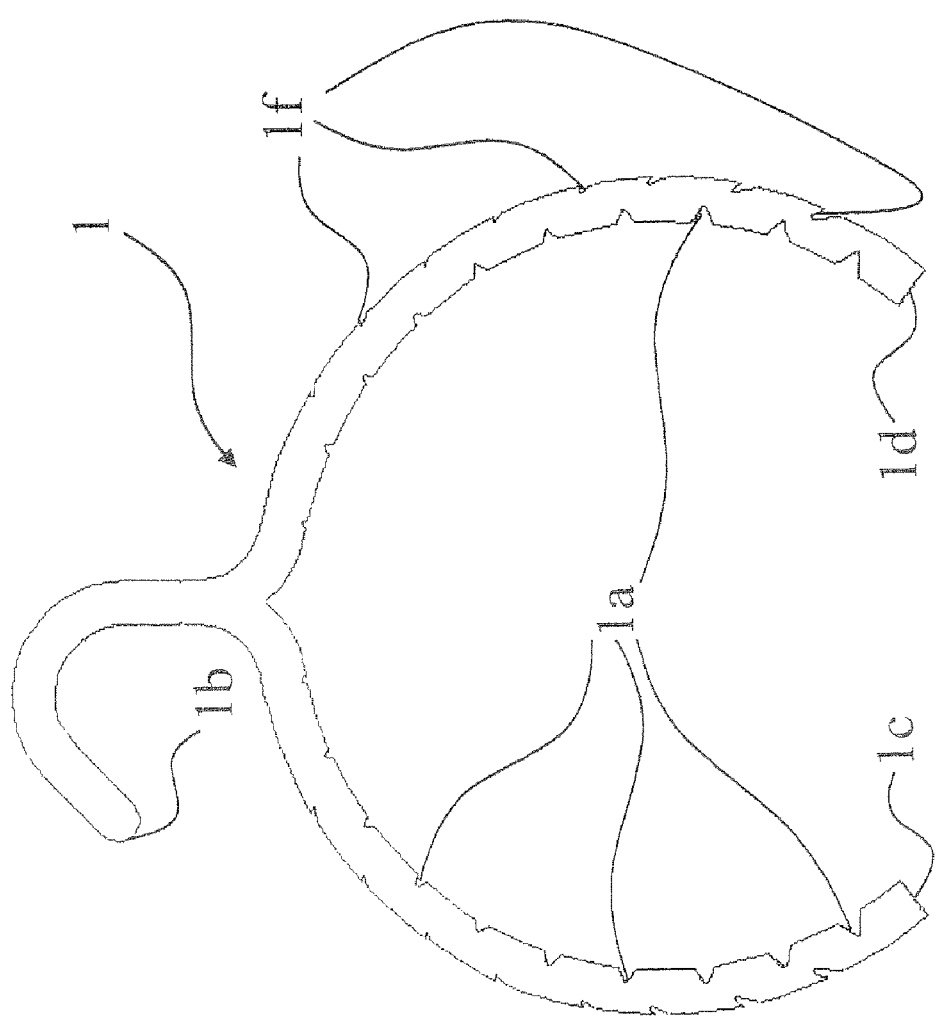
FIG. 3 is a top plan view of the light guide device according to the present invention.

FIGS. 2 and 3 show an illumination device 1 according to the present invention. The device comprises a light guide 1 that is made of transparent material such as polycarbonate or polymethylmethacrylate (PMMA). The light guide 1 three leg portions 3a, 3b, 3c terminating in ends 1b, 1c, 1d. The end 1b is coupled to a LED 4, such as but not limited to a top LED type, so that most of the emitted light is confined and transported efficiently within the light guide material by internal reflections. Top LED sources will be well known to those skilled in the art. A top LED is a type of LED that emits light in the perpendicular direction to the printed circuit board. Each leg 3b, 3c has an external peripheral portion P1 having external radius R2 and an internal peripheral portion P2 having internal radius R1. The radiuses of curvatures R1, R2 of these leg portions of the light guide are determined such that light losses are minimized.

Figure 4A:
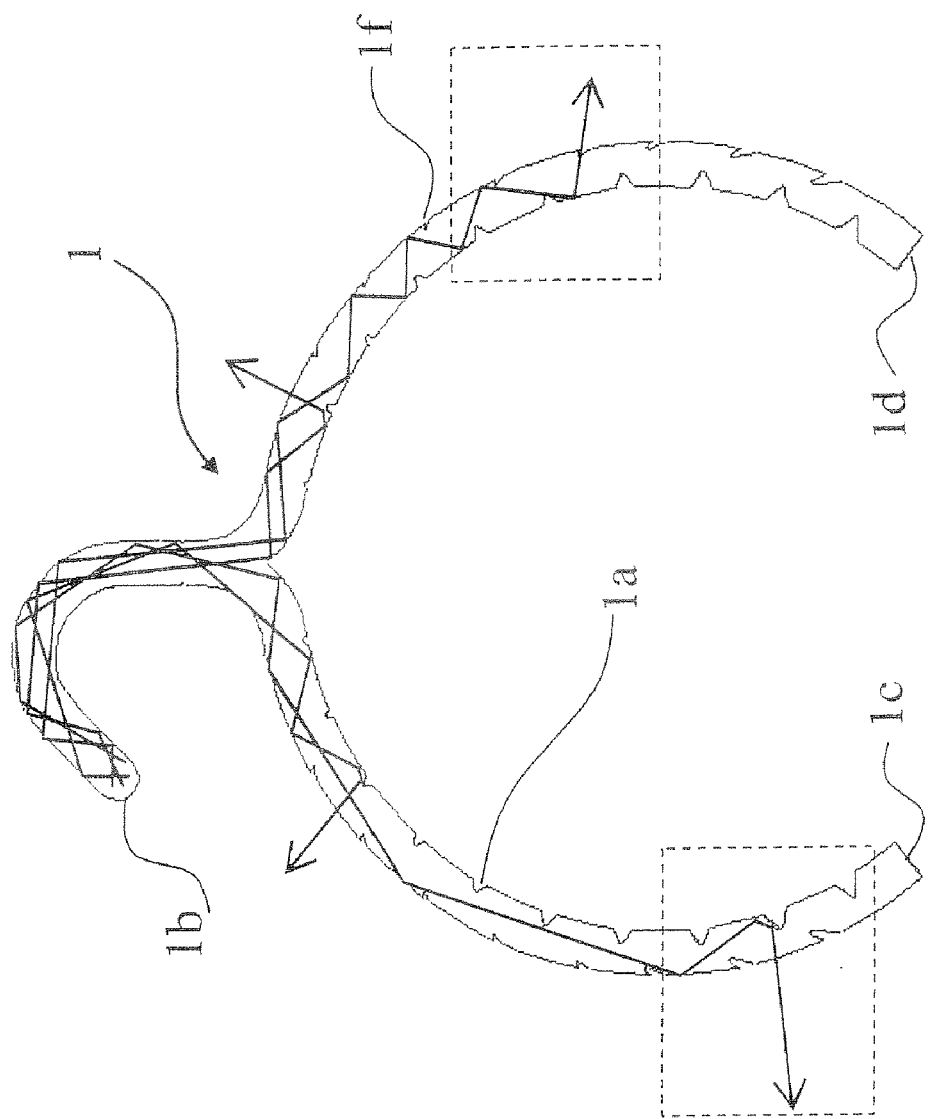
FIG. 4a is a schematic top plan view of the light guide device illustrating light paths through the light guide device.
Figure 4B:
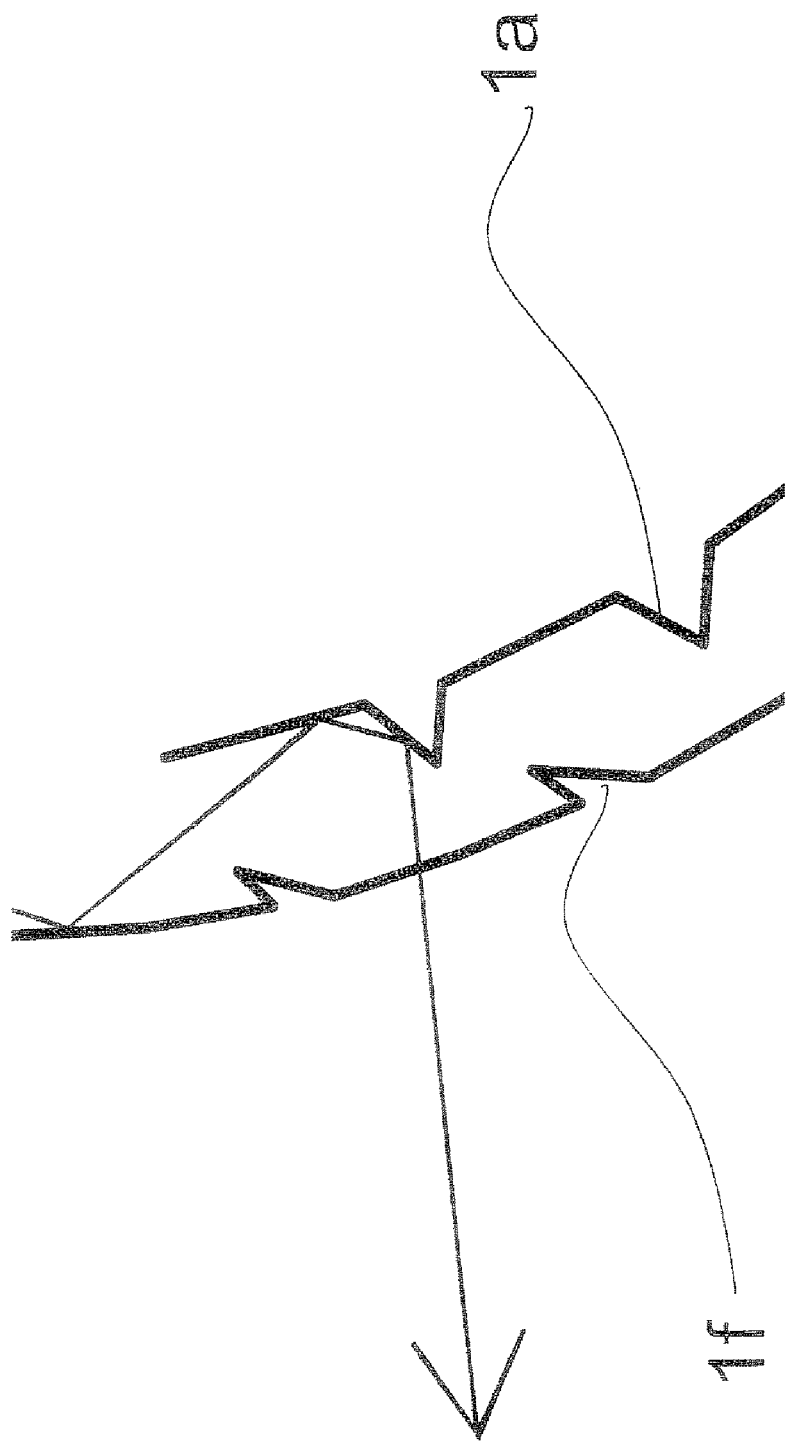
FIG. 4b is a enlarged fragmentary top plan view of a portion of FIG. 4a illustrating light escaping by mean of first grooves located around an internal peripheral portion.

Junction 1e is substantially symmetric so that light is equally distributed in the two leg portions 3b, 3c which are symmetric in the illustrated embodiment of the invention. As shown in FIG. 3, grooves 1a where material has been removed from the light guide 1 are created to cause the confined light to escape from the light guide. The grooves 1a are cut progressively deeper around the internal peripheral portion P2 of each leg portion 3b, 3c. This means that substantially the same amount of light escapes from the light guide 1 along each leg portion 3b, 3c to ensure even illumination throughout the graphical area. As illustrated in FIGS. 4a and 4b, the light transported within the light guide 1 using grooves 1a is extracted by means of total internal reflection.

Figure 4C:
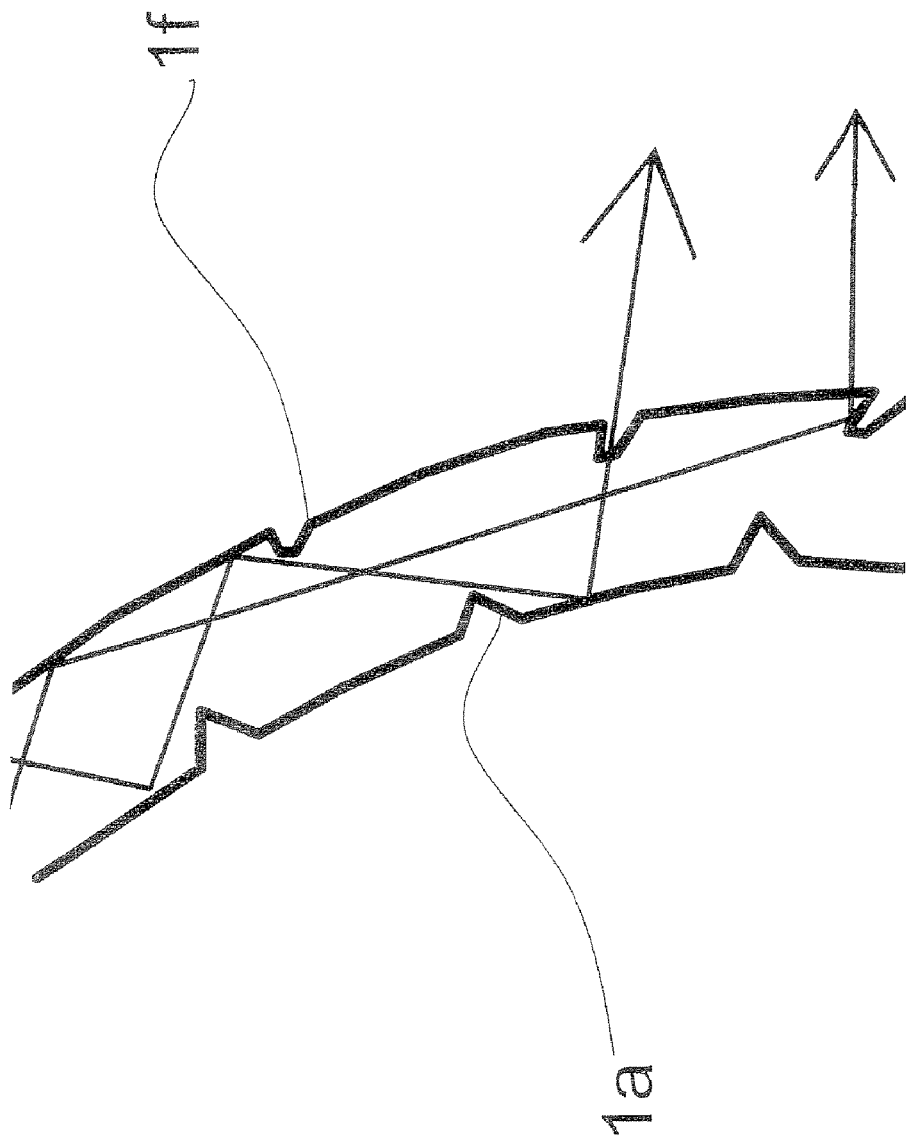
FIG. 4c is a enlarged fragmentary top plan view of a portion of FIG. 4a illustrating light escaping by mean of second grooves located around an external peripheral portion.

Grooves 1f are formed around the external peripheral portion P1. The grooves 1f allow further light to escape in a controlled manner by mean of total internal reflection or Fresnel refraction, as it is illustrated by a ray tracing diagram in FIGS. 4a and 4c. The grooves 1f considerably enhance the optical efficiency by extracting most of the available light near the ends 1c, 1d. Additionally, the inclusion of grooves 1f offer extra freedom of design, in order to obtain evenness of illumination during the optical design and hence a significant reduction in engineering time. Again the grooves f are cut progressively deeper around the external peripheral portion P1 of each leg portion 3b, 3c.

Figure 5:
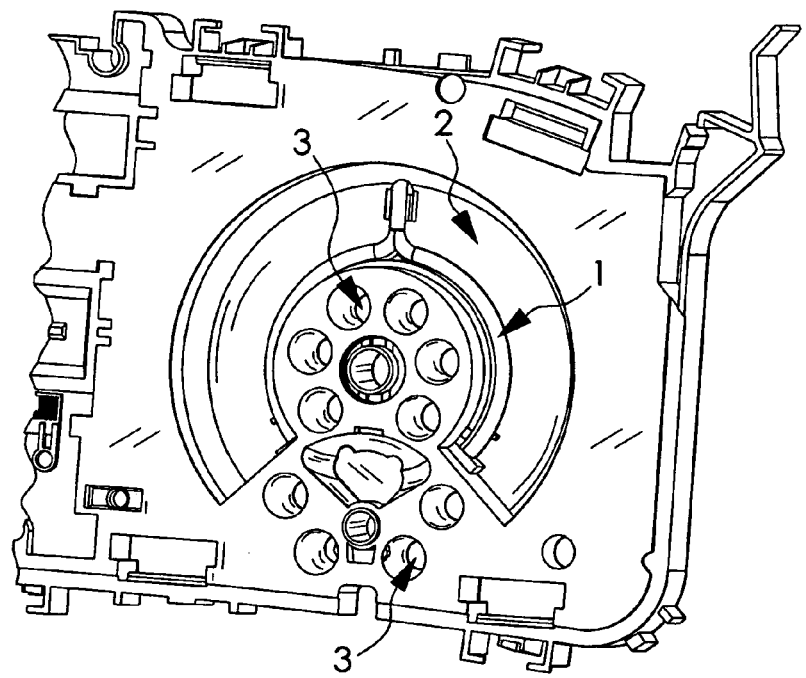
FIG. 5 is a perspective view of an illumination device according to the present invention.
Figure 6:
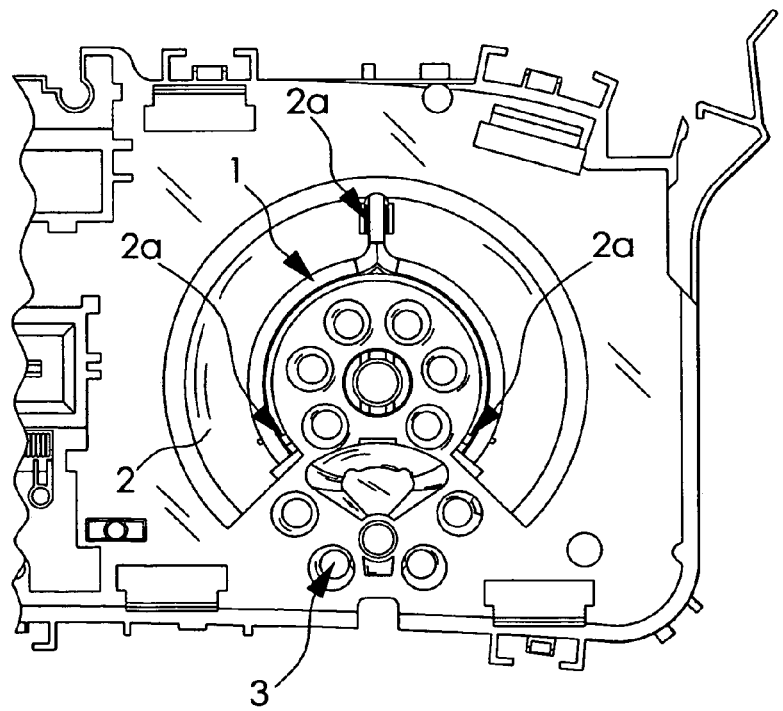
FIG. 6 is a top plan view of the illumination device according to the present invention.

FIG. 5 is a perspective view of the illumination device assembly according to the present invention where it is shown that warning lights 3 are placed around the center of the gauge near a mounting for a pointer and between the light guide ends 1c, 1d. FIG. 6 is a top plan view of the illumination device maintained in a rigid position against mechanical vibrations using clips 2a.

Referring now to FIG. 7, in operation, light is extracted by total internal reflection using grooves 1a, 1f and the escaped light is directed towards a reflective curved surface 2 and toward an information bearing portion 7 of the instrument. The curved surface 2 is made of opaque and diffusing material such as acrylonitrile butadiene styrene (ABS). To improve the optical efficiency of the illumination device assembly, the material of the reflective curved surface is selected to have a high reflectance for the complete wavelength spectrum of the LED source.

The present invention offers an illumination device operating with a single LED source while achieving even illumination. As an example, a standard major gauge such as a speedometer or a tachometer with 320 degrees sweep angle requires approximately 6 LEDs for a typical architecture profile of 15 mm depth (distance between the PCB and an information bearing surface). In contrast, the present invention uses a single LED coupled to a light guide made of clear polycarbonate to achieve similar illumination performance as in conventional gauges. The present invention also allows additional space around the pointer to place warning lights, electronics components, or other display features.

We claim:

1. An illumination device for a vehicle instrument comprising:
   a substantially Y shaped light guide having a first leg portion, a second leg portion, and a third leg portion coupled at a junction;
   a light emitting diode coupled to an end of the first leg portion of said light guide, wherein the second leg portion and the third leg portion include an internal peripheral portion and an external peripheral portion, and wherein the second leg portion and the third leg portion have a plurality of first grooves formed in the internal peripheral portion and a plurality of second grooves formed in the external peripheral portion, the second leg portion and the third leg portion arranged to illuminate a segment of the vehicle instrument.

2. An illumination device for a vehicle instrument according to claim 1, wherein a depth of the first grooves is dependent on a distance of the first grooves from the junction, the depth of the first grooves being greater when the distance is greater.

3. An illumination device for a vehicle instrument according to claim 1, wherein a depth of the second grooves is dependent on a distance of the second grooves from the junction, the depth of the second grooves being greater when the distance is greater.

4. An illumination device for a vehicle instrument according to claim 1, wherein the junction between the second leg portion and the third leg portion is symmetrical to provide for an equal distribution of light from said light emitting diode.

5. An illumination device for a vehicle instrument according to claim 1, wherein said light emitting diode is a top light emitting diode.

6. An illumination device for a vehicle instrument according to claim 1, wherein said light guide is produced from one of polycarbonate and polymethylmethacrylate.

7. An illumination device for a vehicle instrument comprising:
   a substantially Y shaped light guide having a first leg portion, a second leg portion, and a third leg portion coupled at a junction;
   a light emitting diode coupled to an end of the first leg portion of said light guide, wherein the second leg portion and the third leg portion include an internal peripheral portion and an external peripheral portion, and wherein the second leg portion and the third leg portion have a plurality of first grooves formed in the internal peripheral portion, a depth of the first grooves greater when a distance of the first grooves from the junction is greater and the second leg portion and the third leg portion have a plurality of second grooves formed along the external peripheral portion, a depth of the second grooves greater when a distance of the second grooves from the junction is greater, the second leg portion and the third leg portion arranged to illuminate a segment of the vehicle instrument.

8. An illumination device for a vehicle instrument according to claim 7, wherein the junction between the second leg portion and the third leg portion is symmetrical to provide an equal distribution of light from said light emitting diode.

9. An illumination device for a vehicle instrument according to claim 7, wherein said light emitting diode is a top light emitting diode.

10. An illumination device for a vehicle instrument according to claim 7, wherein said light guide is produced from one of polycarbonate and polymethylmethacrylate.

11. An illumination device for a vehicle instrument according to claim 7, wherein the second leg portion and the third leg portion are arranged to illuminate a substantially circular information bearing surface.

12. An instrument assembly for a vehicle comprising:
   an information bearing surface;
   a reflector disposed adjacent said information bearing surface;
   an illumination device including a substantially Y shaped light guide having a first leg portion, a second leg portion, and a third leg portion coupled at a junction and a light emitting diode coupled to an end of the first leg portion of the light guide, wherein the second leg portion and the third leg portion include an internal peripheral portion and an external peripheral portion, and wherein the second leg portion and the third leg portion have a plurality of first grooves formed in the internal peripheral portion and a plurality of second grooves formed in the external peripheral portion, the second leg portion and the third leg portion arranged to illuminate said information bearing surface, said illumination device disposed between said information bearing surface and said reflector, wherein light leaving said illumination device is reflected by said reflector toward said information bearing surface.

13. An instrument assembly for a vehicle according to claim 12, wherein the first grooves have a depth dependent on a distance of the first grooves from the junction, the depth of the first grooves being greater when the distance is greater.

14. An instrument assembly for a vehicle according to claim 12, wherein a depth of the first grooves is dependent on a distance of the first grooves from the junction, the depth of the first grooves being greater when the distance is greater.

15. An instrument assembly for a vehicle according to claim 12, wherein a depth of the second grooves is dependent on a distance of the second grooves from the junction, the depth of the second grooves being greater when the distance is greater.

16. An instrument assembly for a vehicle according to claim 12, wherein the light emitting diode is a top light emitting diode.

17. An instrument assembly for a vehicle according to claim 12, wherein the light guide is produced from one of polycarbonate and polymethylmethacrylate.

18. An instrument assembly for a vehicle according to claim 12, wherein the second leg portion and the third leg portion are arranged to illuminate a substantially circular information bearing surface.

19. An instrument assembly for a vehicle according to claim 12, wherein the second leg portion and the third leg portion substantially enclose a central portion of said information bearing surface, wherein warning lights are disposed in the central portion.

20. An instrument assembly for a vehicle according to claim 12, wherein said reflector is produced from acrylonitrile butadiene styrene.

* * * * *